US009953014B1

(12) United States Patent
Reshadi et al.

(10) Patent No.: US 9,953,014 B1
(45) Date of Patent: Apr. 24, 2018

(54) COLLECTION MANAGEMENT IN DOCUMENT OBJECT MODEL VIRTUALIZATION

(71) Applicant: Instart Logic, Inc., Mountain View, CA (US)

(72) Inventors: Mohammad Reshadi, Sunnyvale, CA (US); Brian Kennedy, Sunnyvale, CA (US)

(73) Assignee: Instart Logic, Inc., Palo Alto, CA (US)

( * ) Notice: Subject to any disclaimer, the term of this patent is extended or adjusted under 35 U.S.C. 154(b) by 788 days.

(21) Appl. No.: 14/075,930

(22) Filed: Nov. 8, 2013

(51) Int. Cl.
*G06F 17/22* (2006.01)

(52) U.S. Cl.
CPC .................... *G06F 17/2247* (2013.01)

(58) Field of Classification Search
CPC .................................................. G06F 17/2247
USPC ............................................... 715/234
See application file for complete search history.

(56) References Cited

U.S. PATENT DOCUMENTS

| 7,210,097 | B1* | 4/2007 | Clarke | G06F 17/30917 |
| | | | | 707/999.202 |
| 8,495,171 | B1* | 7/2013 | Potekhin | G06F 17/30899 |
| | | | | 709/217 |
| 2005/0033725 | A1* | 2/2005 | Potter | G06F 17/30604 |
| 2007/0294333 | A1* | 12/2007 | Yang | G06F 17/30899 |
| | | | | 709/203 |
| 2009/0258594 | A1* | 10/2009 | Martin-Cocher | H04L 65/4023 |
| | | | | 455/3.06 |
| 2012/0066586 | A1* | 3/2012 | Shemesh | G06F 17/30902 |
| | | | | 715/235 |
| 2012/0194519 | A1* | 8/2012 | Bissell | G06F 17/30905 |
| | | | | 345/428 |
| 2012/0260157 | A1* | 10/2012 | Zhu | G06F 17/30902 |
| | | | | 715/234 |
| 2013/0007590 | A1* | 1/2013 | Rivera | G06F 3/0481 |
| | | | | 715/234 |
| 2014/0122995 | A1* | 5/2014 | Beckmann | G06F 17/3089 |
| | | | | 715/234 |
| 2014/0344663 | A1* | 11/2014 | Joel | G06F 17/2264 |
| | | | | 715/234 |
| 2015/0007108 | A1* | 1/2015 | Ozcelik | G06F 3/0485 |
| | | | | 715/810 |

* cited by examiner

*Primary Examiner* — Frank D Mills
(74) *Attorney, Agent, or Firm* — Van Pelt, Yi & James LLP

(57) ABSTRACT

Providing interaction to an application with a collection of information stored in a Document Object Model is disclosed. The collection is maintained in the Document Object Model. A virtualization layer provides one or more collection interfaces to the collection. An indication of an interaction of the application with the collection is received. The collection interfaces include a safety buffer and the interaction of the application with the safety buffer triggers a functionality of the virtualization layer.

23 Claims, 8 Drawing Sheets

```
                                    200
                                   /
<html>
  <head>
     <title>Welcome</title>
  </head>
  <body>
     <h1>HelloWorld </h1>
                .
                .
                .
     <img src = "url for image"/>
     <video>
        <source src = "url for video" type = "video/ogg"  />
     </video>
     <script type = "text/javascript">
     <!--script
     *** Some javascript code is placed here ***
     -->
     </script>
  </body>
</html>
```

Script

FIG. 2

COLLECTION MANAGEMENT IN DOCUMENT OBJECT MODEL VIRTUALIZATION

BACKGROUND OF THE INVENTION

Typically, a web browser needs to receive the dependent resources associated with different links and URLs before it can complete the rendering of a webpage. The startup wait time experienced by an end-user of a browsing session may be insignificant in low-latency networks, such as wired Ethernet networks, but unacceptably long for an end-user in higher-latency networks, such as cellular 3G networks. One technique of reducing the wait time includes optimizing delivery of information by efficiently managing intercepted resources of a webpage. For example, an intermediary agent intercepts and processes resources of the webpage to enable efficient information delivery. However, some objects of a webpage are dynamic and may change without the knowledge of the intermediary agent. For example, live collections of elements may dynamically grow without knowledge of the intermediary agent due to complexity in webpage code that is difficult for the intermediary agent to detect. Without knowledge of all webpage elements, the intermediary agent may be unable to efficiently and correctly optimize delivery of the webpage. Therefore, there exists a need for a way to more effectively manage dynamic elements of a webpage.

BRIEF DESCRIPTION OF THE DRAWINGS

Various embodiments of the invention are disclosed in the following detailed description and the accompanying drawings.

FIG. 2 is a diagram illustrating an embodiment of a webpage described by an HTML file.

DETAILED DESCRIPTION

Figure 1:
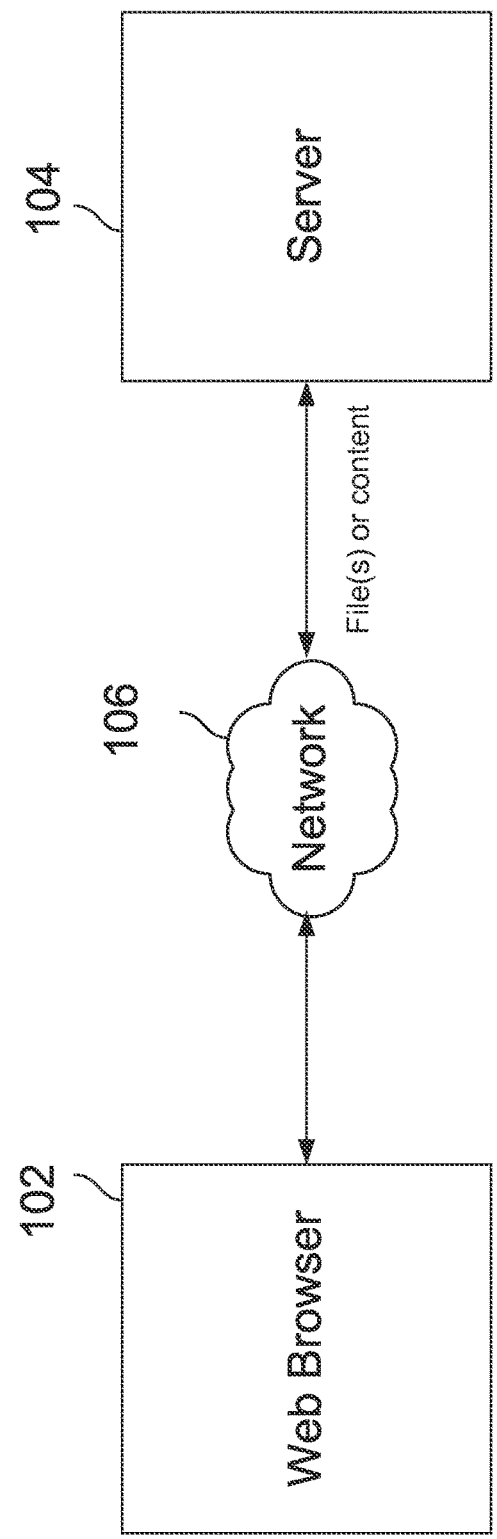
FIG. 1 is a block diagram illustrating an embodiment of a web browser accessing webpages and other information through a network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing interaction to an application with a collection of information stored in a Document Object Model (i.e., DOM) is disclosed. A browser maintains a collection and/or one or more elements of a collection in DOM. For example, a web browser builds a DOM of a webpage to be rendered by the web browser and the DOM includes a live collection (e.g., table, list, tree, database, hash table, etc.) that includes a group of elements. In some embodiments, a virtualization layer provides collection interfaces to the collection. For example, by generating custom interfaces that access the elements of the collection, the virtualization layer is able to control the flow of data included in the collection. An application such as a JavaScript application included in the webpage may interact with the collection. For example, a JavaScript application may request a collection of one or more objects of the DOM and add an element to the DOM that causes the added element to be automatically added to the collection. The collection interface utilized by the application to interact with the collection includes a safety buffer and an interaction of the application with the collection interface may trigger the safety buffer that triggers a functionality of the virtual layer. For example, the safety buffer triggers the virtual layer to analyze elements of the collection to determine whether any of the elements have not been processed by the virtual layer and process the unprocessed elements to allow the virtual layer to become aware of the unprocessed elements.

FIG. 1 is a block diagram illustrating an embodiment of a web browser accessing webpages and other information through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustration purposes only; accordingly, the present application is not limited to these specific examples.

FIG. 2 is a diagram illustrating an embodiment of a webpage 200 described by an HTML file. To display the webpage, web browser 102 sends a Hypertext Transfer Protocol (HTTP) request message to server 104 requesting the HTML webpage file. After server 104 locates the requested HTML webpage file, server 104 returns the requested HTML webpage file in an HTTP response message to web browser 102. As web browser 102 begins to render the webpage on a screen, web browser 102 parses the received webpage file and builds a data structure to represent the various components of the webpage in a local memory.

The Document Object Model (DOM) is a standardized model supported by different web browsers, e.g., Internet Explorer, Firefox, and Google Chrome, to represent the various components of a webpage. The DOM is a cross-platform and language-independent convention for representing and interacting with objects in HTML documents, as well as XHTML and XML documents. Objects in a DOM tree may be addressed and manipulated using methods on the objects. The public interface of a DOM is specified in its application programming interfaces (APIs).

The DOM standard includes different levels. DOM core level 0 and level 1 are the core standards supported by all web browsers, while DOM levels 2 and above are extensions to DOM core level 0 and level 1, which can be optionally supported by different web browsers. DOM core level 0 and level 1 define a minimal set of objects and interfaces for accessing and manipulating document objects. It provides a complete model for an entire HTML document, including the means to change any portion of the document.

The DOM standard represents documents as a hierarchy of node objects, called a DOM tree. Some types of nodes may have child nodes of various types, and others are leaf nodes that cannot have any object below them in the document structure hierarchy. One example type of node object is a collection. For example, one collection node object may include one or more elements grouped together as a collection. Examples of the collection include a table, a list, a linked list, a tree, a database, an array, and a hash table. Running a query on the DOM may also generate stand-alone collection. For example, a function/method call may return a dynamically generated collection that includes one or more elements included in the DOM that match a desired criteria. In some embodiments, the collection is "live." Elements may be dynamically added, removed, and/or modified in the "live" collection when underlying elements are changed by another method/process/object (e.g., underlying elements in the DOM tree changes). In some embodiments, elements of a collection are accessed using an accessing function/method. For example, one or more APIs specify the function/method that may be used to obtain, add, remove, modify, and query the status of a collection element.

Figure 3:
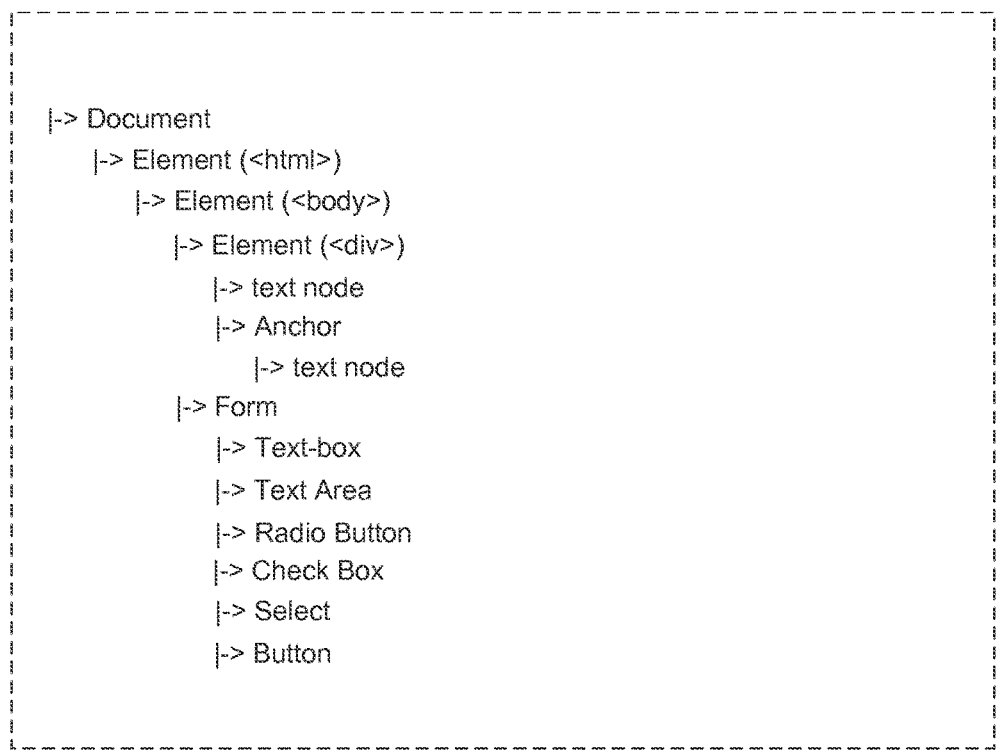
FIG. 3 is a diagram illustrating an embodiment of a DOM tree.

FIG. 3 is a diagram illustrating an embodiment of a DOM tree 300. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

With continued reference to FIG. 2, when web browser 102 renders webpage 200 on a screen, web browser 102 parses the received HTML webpage file and builds a DOM tree to represent the various components of webpage 200 in a local memory. For example, when the image tag (shown as <img src="url for image"/> in FIG. 2) is parsed by web browser 102, the image is represented as an image object, and the image object is inserted into the DOM tree accordingly.

After the webpage file is parsed and the corresponding DOM tree is created, the entire DOM tree can be traversed to retrieve any dependent resources (e.g., images, audio clips, or videos) indicated by any of the nodes in the DOM tree via a network. For example, the image object corresponding to the image tag in webpage 200 redirects web browser 102 to fetch an image file from a uniform resource locator (URL). Accordingly, web browser 102 sends a request via a network, requesting the image resource to be downloaded. There are two ways a request may be issued: statically, in which case it is the browser which manipulates the DOM; or dynamically, in which case the DOM manipulation is done by Javascript. In response to the request, the requested dependent resource is sent to web browser 102 via a network.

For example, if the nodes of the DOM tree include N different links and/or URLs, N separate GET requests (e.g., N separate HTTP GET requests) are sent via a network requesting the dependent resources to be sent to web browser 102. In response, N separate GET responses (e.g., N separate HTTP GET responses) are sent to web browser 102, delivering the dependent resources to web browser 102.

The round trip time or network response time for a GET request to arrive at an edge server and for its corresponding GET response to arrive at web browser 102 is dependent on the latency of the network, which is different for different types of networks. The network may be any combination of different types of public or private networks, including intranets, local area networks (LANs), wide area networks (WANs), radio access networks (RANs), Wi-Fi networks, the Internet, and the like. Therefore, the latency associated with the network may vary depending on its network type(s).

Some networks have relatively lower network latency. For example, the network latency associated with WANs or Wi-Fi networks is relatively low, e.g., on the order of 10 milliseconds. Suppose the number of links and/or URLs included in the DOM tree, N, is equal to twenty. The total network latency associated with receiving the dependent resources associated with the twenty links and/or URLs from the edge server is then approximately 200 milliseconds.

Some networks have relatively higher network latency. For example, the network latency associated with a $3^{rd}$ generation mobile telecommunications (3G) network is relatively high, e.g., on the order of 100 milliseconds. In this instance, the total network latency associated with receiving the dependent resources associated with the twenty links and/or URLs from the edge server is then on the order of 2 seconds.

Since the network latency associated with different types of networks varies widely, and web browser 102 needs to receive the dependent resources associated with the links and URLs before web browser 102 can complete the rendering of webpage 200, the startup wait time experienced by the end-user of the browsing session may be insignificant in low-latency networks, such as Wi-Fi networks, but unacceptably long for an end-user in higher-latency networks, such as 3G networks.

Figure 4:
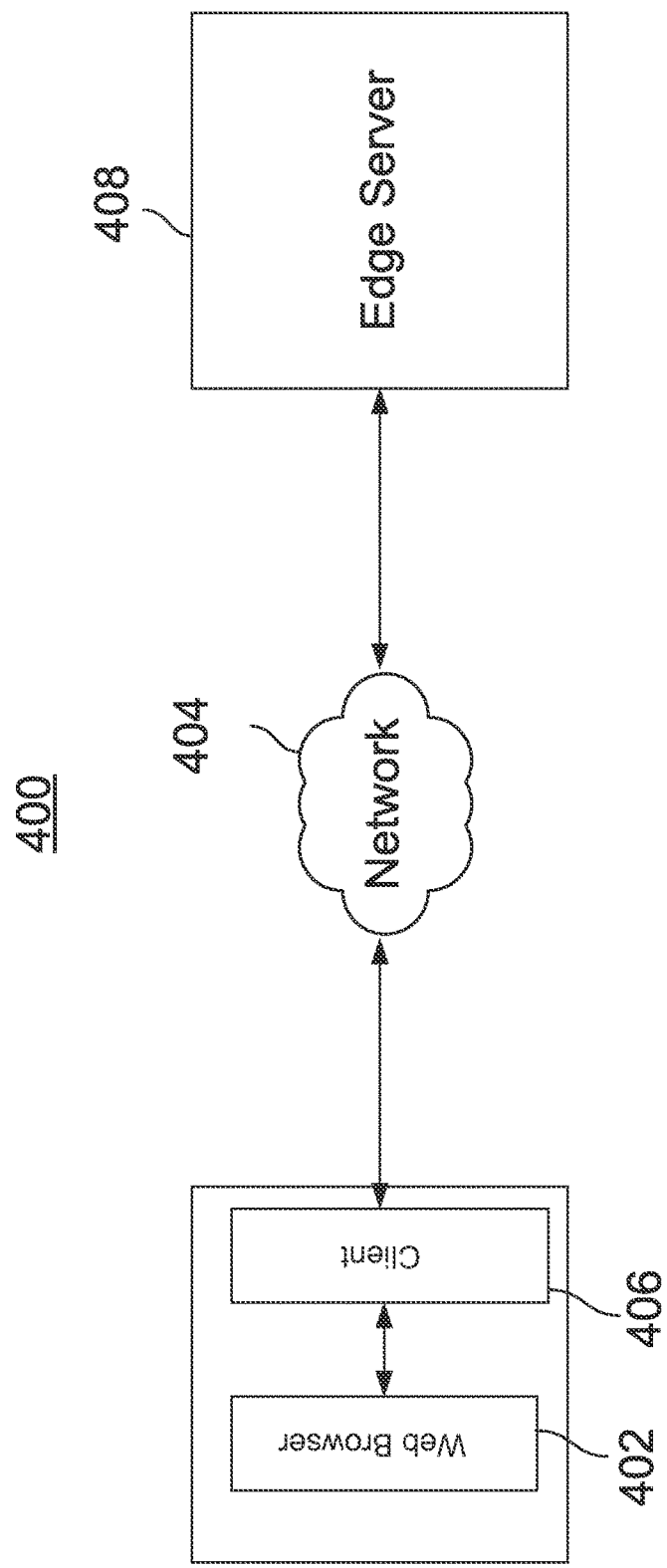
FIG. 4 is a block diagram illustrating an embodiment of a client-server system for virtualizing a DOM of a web browser.

FIG. 4 is a block diagram illustrating an embodiment of a client-server system 400 for virtualizing a DOM of a web browser. Virtualization of a DOM of a web browser allows the client-server system to take control of the DOM for different kinds of optimizations, while keeping the virtualization transparent to the web browser. A web browser 402 accesses webpages and other information through a network 404. When web browser 402 sends any network messages onto network 404 that are related to the downloading of webpages or other information, the messages may be either intercepted and processed by a client 406, or directly received and then processed by an edge server 408 supporting virtualization. Webpages or other information related to the webpages that are sent to web browser 402 may be intercepted, filtered, processed, or provided by client 406 or edge server 408. In addition, method API calls by web browser 402 or any JavaScript code (e.g., web application executed by web browser 402) to manipulate the objects in a DOM tree may be intercepted, processed, or modified by client 406. Client 406 may also manipulate the DOM tree by making the appropriate method API calls to the DOM tree. As a result, client 406 and edge server 408 together create a virtualization engine for the DOM of web browser 402. The virtualization engine may access and manipulate a DOM tree, including the creation, deletion, or update of nodes within the DOM tree.

Virtualization of the DOM of web browser 402 may be applicable to different types of optimization. In some embodiments, using the virtualization engine, optimized delivery of information over a network by segmentation and reprioritization of downloaded information can be achieved. For example, using the virtualization engine, the delivery of the information (e.g., the order in which the information is delivered or the granularity of the information delivered) and the actual content of the delivered information corresponding to any nodes of the DOM tree may be altered, thereby speeding up the rendering of a webpage, without compromising the end-user's experience.

In some embodiments, the virtualization of the DOM of web browser 402 is transparent to web browser 402. In some embodiments, the virtualization of the DOM of web browser 402 is also transparent to the end-users. The end-users are not required to install any plugins. In some embodiments, the virtualization of the DOM of web browser 402 is also transparent to the content publishers, without requiring the content publishers to change any codes. In some embodiments, client 406 may be injected into web browser 402 based on standards-based (e.g., HTML or JavaScript) procedures. For example, after edge server 408 receives a request from web browser 402 requesting an HTML webpage file, server 408 may parse the HTML webpage file, inject client 406 into the HTML webpage file, and then send the response back to web browser 402. In some embodiments, client 406 may be injected by adding JavaScript client code in the head section of the HTML webpage file.

Virtualization of the DOM of web browser 402 includes handling static and dynamic interactions with the DOM of web browser 402. Both types of interactions may be intercepted or virtualized by the virtualization engine.

Dynamic interactions with the DOM of web browser 402 include interactions that are affected by JavaScripts (e.g., Ajax). The DOM of web browser 402 is virtualized by having client 406 intercept and virtualize method API calls to create, delete, or modify elements in the DOM. In some embodiments, only DOM core level 1 APIs, which are supported by all standardized web browsers, are intercepted and virtualized. The DOM core level 1 APIs for manipulating the DOM tree are supplanted by the equivalent JavaScript interfaces of the virtualization engine.

One example interaction with the DOM includes a web application of a webpage processed by web browser 402 that dynamically attempts to modify the DOM. Client 402 may exist between the application and web browser 402. The application of the webpage may attempt to create an element of a DOM such as a collection. The request to create the element is provided by the application to the web browser (e.g., web browser 402) and the web browser creates the collection and places the created collection in the DOM. The web browser then attempts to pass the created collection back to the application. When the collection is attempted to be passed to the application, the collection is intercepted (e.g., by client 406) and the collection is further processed (e.g., contents wrapped with code to allow virtualization/tracking/manipulation) for virtualization before being passed back to the requesting web application.

Static interactions to the DOM of web browser 402 include interactions corresponding to static HTML tags in an HTML webpage file (e.g., the <img src="url for image"/> tag as shown in FIG. 2). An HTML tag redirects web browser 402 to fetch a dependent resource (e.g., an image file) from a URL. Because the static GET request is not made via a JavaScript, the static request is not intercepted by client 406. Instead, the static request is sent by web browser 402 in its native form and then routed over the network, e.g., by means of DNS resolution, to an edge server 408 supporting virtualization.

In some embodiments, edge server 408 may discern whether a GET request is sent by web browser 402 or client 406 using a signature-based scheme, thus enabling edge server 408 to handle the static case as mentioned above. For example, if a GET request was sent by client 406, the GET request would be stamped with a predetermined signature. Conversely, if the GET request was sent directly from web browser 402, as in the static case, the GET request would not be stamped with the predetermined signature.

In some embodiments, when a GET request is sent directly from web browser 402 in a static case, edge server 408 may send dummy content in response, causing web browser 402 to create a dummy node in the DOM tree. At the same time, edge server 408 may also notify client 406, e.g., by sending a JavaScript, that a dummy node has just been created in the DOM tree, thereby eliminating the need for client 406 to poll the DOM tree for any new dummy nodes added to the DOM tree. Client 406, being notified of the newly created dummy node in the DOM tree, may dynamically update the dummy node with the actual content by issuing one or more JavaScript requests to edge server 408. In response to the one or more requests, edge server 408 sends one or more JavaScript updates, which are then intercepted by client 406, which may then populate the dummy node with the actual image content.

Using the virtualization engine, optimized delivery of information over a network by segmentation and reprioritization of downloaded information can be achieved. Note that the delivery of different information to web browser 402 may be determined by the type of information. For example, dependent resources such as images, audio clips, and videos may be delivered using different techniques that are optimized based on the type of resource. In some embodiments, the virtualization engine may selectively alter or modify the delivery of only certain types of information (e.g., images).

Images are used hereinafter as an example of the various dependent resources that can be efficiently downloaded to web browser 402 by the virtualization engine. Note that the examples of downloading images are selected for illustration purposes only; accordingly, the present application is not limited to these specific examples only.

In some other techniques, a compressed image is encoded in a format such that the image file is divided into a series of scans. The first scan shows the image at a lower quality, and the following scans gradually improve the image quality. For example, an image in progressive JPEG format is compressed in multiple passes of progressively higher detail. The initial passes include lower frequency components of the image, while the subsequent passes include higher frequency components of the image. Rendering an image in progressive JPEG format shows a reasonable preview of the image after a first pass of rendering of the lower frequency components of the image, with the image progressively turning sharper with higher detail after subsequent passes. A web browser can begin displaying an image encoded in progressive JPEG format as it is being downloaded from the network, by rendering each successive pass of the image as it is downloaded and received. Doing so improves on the start-up time experienced by the end-user. Nonetheless, upon a GET for an image, the entirety of the image is downloaded. In some instances, components of the webpage other than the image may have higher priority than the details of the progressively encoded image contained in the subsequent passes, and it would be advantageous to download these important components of the web page before the whole image. In some instances, it is preferable to deploy the bandwidth used to download the whole image and to instead download other important components of the webpage. However, such prioritization of webpage content is lost when the image is treated as a single binary content.

In some embodiments, the startup wait time can be reduced by dividing a progressive JPEG image file (or other image files that are compressed in multiple passes of progressively higher detail) into a plurality of segments based on priorities, e.g., frequency. Having control of both ends of the communication in a client and server system, the lower frequency components of the image can be requested by client 406 and sent by edge server 408 first, and then the higher frequency components can be requested by client 406 and sent by edge server 408 dynamically to refresh and sharpen the image.

Since a webpage may include content retrieved by multiple GET requests, by dividing each GET request into a plurality of GET requests, the server transmit queue is reprioritized to transmit (and web browser 402 is reprioritized to render) the higher priority components of each of the GETs first. In particular, if one original GET request corresponds to a huge image, the impact of the huge image blocking all the other GET requests would be lessened. As a result, the latency of seeing the images from the other GET requests is reduced.

In some embodiments, the segment sizes (e.g., the percentages of the original image file) delivered to web browser 402 in response to the plurality of GET requests may be tuned dynamically based on network load, network bandwidth, or other specifics of a user's connection. For example, the size of the first segment may be only 10% of the total image on a high latency and low bandwidth connection, while the size of the first segment may be 90% of the total image on a low latency and high bandwidth connection.

In some embodiments, virtualization of the DOM of web browser 402 requires client 406 and/or edge server 408 to be aware of any changes to elements of the DOM. Static interactions that modify the DOM may be intercepted and processed by client 406 or edge server 408. When specific functions and/or interactions are required to change an element of the DOM, those specific functions/interactions may be tracked and intercepted. However, dynamic changes such as modifications of a live collection included in DOM may take place without utilization of a typical interaction mechanism that can be easily intercepted. For example, an application of a webpage obtains one collection from the DOM and may add an element to that collection dynamically which in turn will automatically updates another "live" collection utilized by another part of the program. Without full programmer knowledge of code of the webpage and web application of the DOM, it would be difficult to detect all instances of changes to collections included in the DOM. Rather than requiring a programmer to report changes to a collection for virtualization purposes or attempting to tackle the difficult task of automatically reversing engineering code to detect collection modifications, a safety buffer may be utilized to detect clues that a collection has been modified. For example, attempts to access a collection element that has not been previously detected may be determined when a placed safety buffer triggering data is accessed in an attempt to access the not previously detected element. In one example, functions/methods (e.g., function/method defined in an API) that modify and/or obtain data of a collection is extended to detect undetected elements of the collection. In another example, functions/methods that query a status of a collection may be modified to analyze the collection for any undetected elements when a query is made on a status of the collection.

Figure 5:
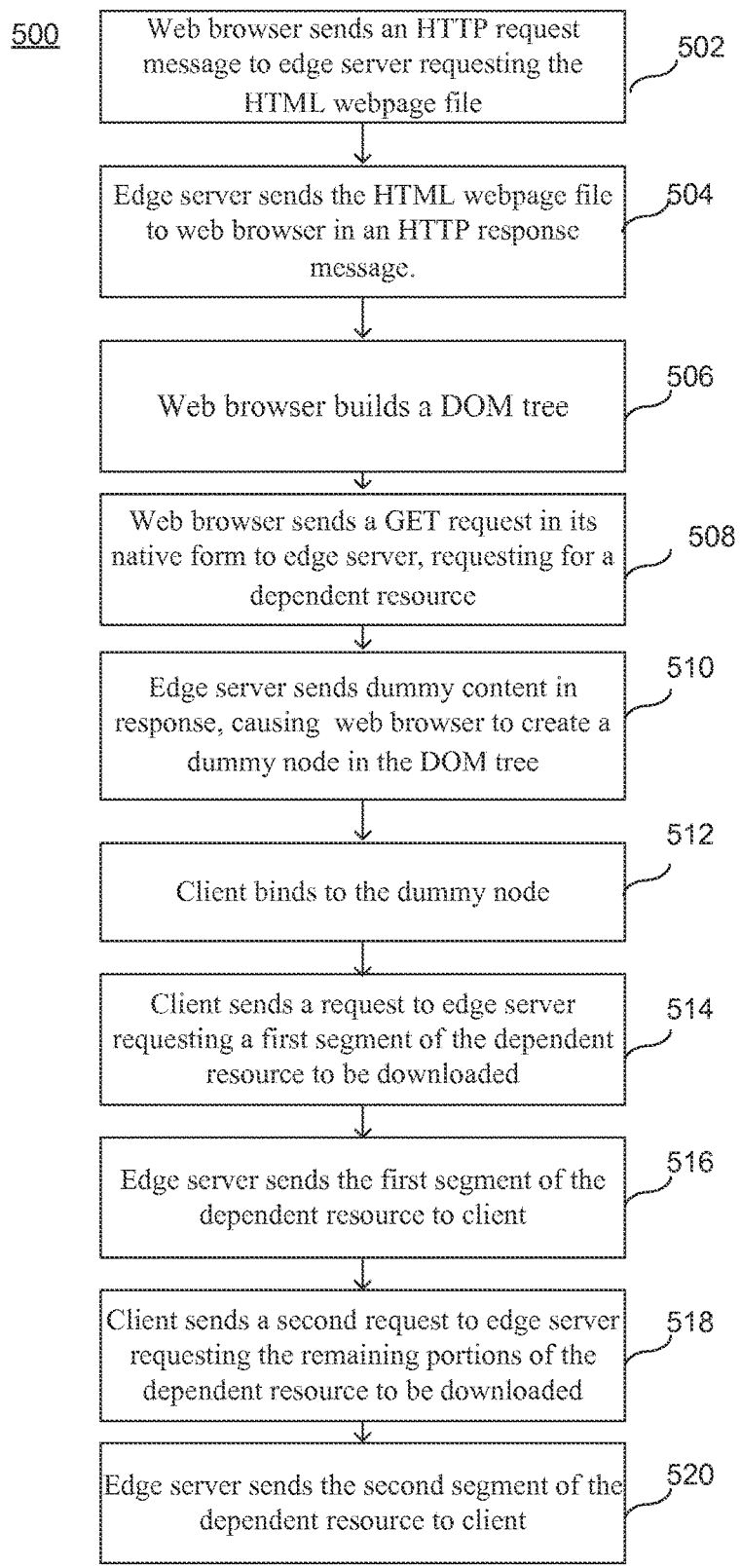
FIG. 5 is a diagram illustrating an embodiment of a flow diagram for optimized delivery of a statically requested dependent resource associated with a webpage.

FIG. 5 is a diagram illustrating an embodiment of a flow diagram 500 for optimized delivery of a statically requested dependent resource associated with a webpage. Flow diagram 500 provides an example for the static case disclosed above. The steps shown in flow diagram 500 may be performed on web browser 402, client 406, and/or edge server 408.

With reference to FIG. 5, at 502, to display a webpage (e.g., webpage 200 as shown in FIG. 2), web browser 402 sends an HTTP request message to edge server 408 requesting the HTML webpage file corresponding to the webpage. After edge server 408 locates the requested HTML webpage file, edge server 408 parses the HTML webpage file, injects client 406 into the HTML webpage file, and then sends the HTML webpage file to web browser 402 in an HTTP response message at 504. Client 406 is then up and running.

At 506, web browser 402 parses the HTML webpage file and builds a DOM tree to represent the various components of webpage 200 in a local memory. For example, when the image tag (shown as <img src="url for image"/> in FIG. 2) is parsed by web browser 402, the image is represented as an image object, and the image object is inserted into the DOM tree accordingly.

After the DOM tree is created, the DOM tree is traversed to retrieve any dependent resources indicated by any of the nodes in the DOM tree via a network. For example, the image object corresponding to the static image tag in webpage 200 redirects web browser 402 to fetch an image file from a URL. At 508, web browser 402 sends a GET request in its native form to edge server 408. Since the GET request is sent directly from web browser 402, the GET request is not stamped with any signature.

At 510, edge server 408 sends dummy content in response, causing web browser 402 to create a dummy node in the DOM tree. Edge server 408 also notifies client 406 that a dummy node corresponding to the dependent resource (e.g., image resource) has just been created in the DOM tree. At 512, client 406 binds to the dummy node. In various embodiments, sending the dummy content is optional. For example, rather than sending the dummy content, a first segment (e.g., the first segment of sent in 516) of the content is provided. In some embodiments, the dummy content is sent along with the first segment of the content.

At 514, client 406 sends a request to edge server 408 requesting a first segment of the dependent resource (e.g., image file) to be downloaded. Note that the underlying communication protocol utilized between client 406 and edge server 408 can be any one of many protocols, including proprietary protocols or standards-based protocols such as HTTP. In some embodiments, the request message sent by client 406 may include different information, including the URL of the dependent resource, the dimensions of the image, and the like. In some embodiments, the request message may also include an indication of how the image should be segmented. For example, the request message may specify a percentage (e.g., 70%) of the total size of the dependent resource to be downloaded. In some embodiments, edge server 408 determines a percentage of the total size of the dependent resource to be downloaded based on network conditions and the like.

At 516, edge server 408 sends the first segment of the dependent resource to client 406. For example, the first segment may be the first scan of a progressive JPEG image, containing the lower frequency components of a progressive JPEG image. Client 406 then uses method API calls to refresh the dummy node in the DOM tree with the received image file, and the initial lower quality image can be rendered on the screen.

At 518, client 406 sends another request to edge server 408, requesting the remaining portions of the dependent resource to be downloaded. At 520, edge server 408 sends the remaining portions (e.g., the remaining 30%) of the dependent resource to client 406. For example, the second segment may be the second scan of a progressive JPEG image, containing the higher frequency components of the progressive JPEG image. Client 406 then uses method API calls to refresh the dependent resource node in the DOM tree with the received content (e.g., to allow a sharper and higher quality image can be rendered on the screen). Although process 500 described sending content in two portions, in various embodiments, the content may be divided and sent in any number of portions. For example, the dependent resource may be sent in three or more portions.

In some embodiments, the refreshing of the dependent resource node (e.g., image node) can be reprioritized based on user actions, user profiles, the statistical behavior of many users in accessing CDN content, or other network profiles.

In some embodiments, the refreshing of the dependent resource node (e.g., image node) can be reprioritized based on user actions. During a browsing session, a user may scroll to the bottom of a webpage before the webpage is loaded to completion. A user may also expand or minimize certain portions of the webpage. These and other user actions can be used to reprioritize the refreshing of the nodes in the DOM tree. For example, if it is detected that the user has scrolled to the bottom of a webpage, then client 406 may delay or disable the refreshing of an image node corresponding to an image that is no longer in the display zone.

In some embodiments, the refreshing of the dependent resource node (e.g., image node) can be reprioritized based on CDN content access statistics. For example, statistics may indicate that very few users choose to look at images on the bottom left corner of the webpage. In this case, client 406 may delay or disable the refreshing of the image nodes corresponding to those images.

Figure 6:
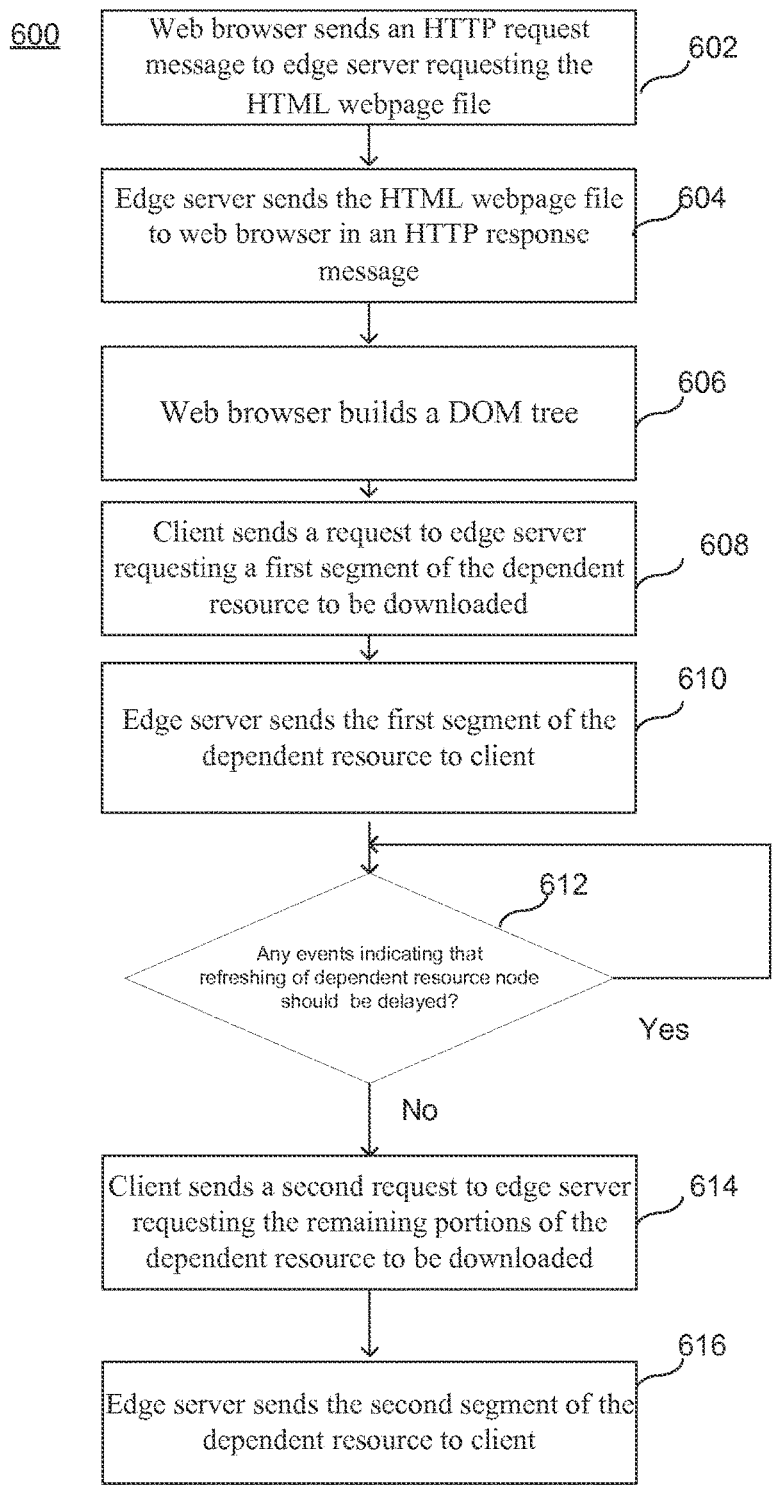
FIG. 6 is a diagram illustrating an embodiment of a flow diagram for optimized delivery of a dynamically requested dependent resource associated with a webpage.

FIG. 6 is a diagram illustrating an embodiment of a flow diagram 600 for optimized delivery of a dynamically requested dependent resource associated with a webpage. Flow diagram 600 provides an example for the dynamic case disclosed earlier. The steps shown in flow diagram 600 may be performed using web browser 402, client 406, and/or edge server 408.

With reference to FIG. 6, at 602, to display a webpage (e.g., webpage 200, as shown in FIG. 2), web browser 402 sends an HTTP request message to edge server 408 requesting the HTML webpage file corresponding to the webpage. After edge server 408 locates the requested HTML webpage file, edge server 408 parses the HTML webpage file, injects client 406 into the HTML webpage file, and then sends the HTML webpage file to web browser 402 in an HTTP response message at 604. Client 406 is then up and running.

At 606, web browser 402 parses the HTML webpage file and builds a DOM tree to represent the various components of webpage 200 in a local memory. When the script tag (as shown in FIG. 2) is parsed by web browser 402, a JavaScript is executed. JavaScript is one or many managed programming languages (e.g., runs in a Common Language Runtime) that may be utilized in various embodiments. If the JavaScript creates a dependent resource node, then the corresponding DOM core level 1 method API call(s) are intercepted by client 406 as part of the virtualization of the DOM, enabling client 406 to control the delivery of the content related to the node. The dependent resource node may include a collection or may at least in part include an element belonging to one or more collections.

At 608, client 406 sends a request to edge server 408 requesting a first segment of the dependent resource (e.g., image file) to be downloaded. Note that the underlying communication protocol utilized between client 406 and edge server 408 can be any one of many protocols, including proprietary protocols or standards-based protocols such as HTTP. In some embodiments, the request message sent by client 406 may include different information, including the URL of the image resource, the height and width of the image, and the like. In some embodiments, the request message may also include an indication of how the dependent resource should be segmented. For example, the request message may specify a percentage (e.g., 70%) of the total size of the dependent resource to be downloaded. In some embodiments, edge server 408 determines a percentage of the total size of the dependent resource to be downloaded based on network conditions, and the like.

At 610, edge server 408 sends the first segment of the dependent resource to client 406. For example, the first segment may be the first scan of a progressive JPEG image, including the lower frequency components of a progressive JPEG image. Client 406 then uses method API calls to refresh the dependent resource node in the DOM tree with the received image file (e.g., to allow the initial lower quality image can be rendered on the screen).

At 612, client 406 determines whether there are any events indicating that refreshing of the dependent resource node (e.g., image node) should be delayed or disabled. For example, the events checked by client 406 may be any event related to user actions, user profiles, statistical behavior of many users in accessing CDN content, or other network profiles as disclosed above.

If the event is not detected, then client 406 sends another request to edge server 408 requesting the remaining portions of the dependent resource to be downloaded, at 614. If the event is detected, step 612 is repeated after a predetermined and/or dynamically determined amount of time. At 616, edge server 408 sends the remaining portions (e.g., the remaining 30%) of the dependent resource to client 406. For example, the second segment may be the second scan of a progressive JPEG image, including the higher frequency components of the progressive JPEG image. Client 406 then uses method API calls to refresh the dependent resource (e.g., image node) in the DOM tree with the received image file (e.g., to allow a sharper and higher quality image can be rendered on the screen). Although process 600 described sending content in two portions, in various embodiments, the content may be divided and sent in any number of portions. For example, the dependent resource may be sent in three or more portions.

In some embodiments, client 406 may combine more than one GET request into a single GET request before sending to edge server 408, thereby reducing the overall round trip delays. In some embodiments, edge server 408 may convert a dependent resource from one format to another format (e.g., from PNG image to JPG plus an alpha channel image) before sending the dependent resource to client 406 for faster delivery through the network. Client 406 can convert the dependent resource back to the original format before use (e.g., before the image is rendered on the screen).

Figure 7:
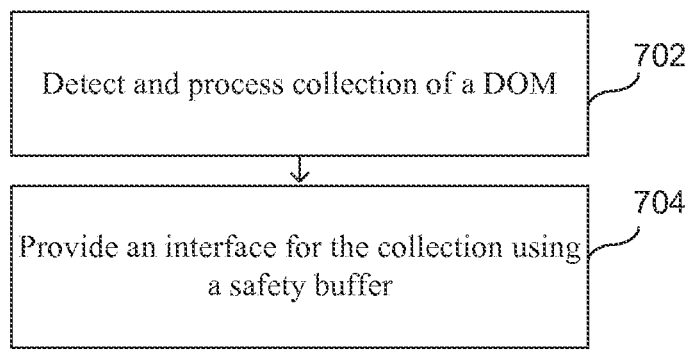
FIG. 7 is a diagram illustrating an embodiment of a flow diagram for optimized detection of collection elements associated with a webpage.

FIG. 7 is a diagram illustrating an embodiment of a flow diagram 700 for optimized detection of collection elements associated with a webpage. The steps shown in flow diagram 700 may be performed using web browser 402, client 406, and/or edge server 408.

At 702, a collection of a DOM is detected and processed. In some embodiments, if an application of a webpage (e.g., a JavaScript application) initially creates a collection, then the corresponding DOM method API call(s) are intercepted by client 406 as part of the virtualization of the DOM, enabling client 406 to control the management and/or delivery of the content related to the collection. The application may be programmed in any of a number of managed programming languages (e.g., runs in a Common Language Runtime) such as JavaScript, Java, .Net, etc. Each element included in the collection may be individually processed to enable virtualization, management, and/or delivery of the content of each element. Examples of the collection include a list, a linked list, a table, a tree, a hash table, a database, an array, and another structure for grouping one or more elements. In some embodiments, creation of the collection is detected. In some embodiments, a method call by the application creates a collection that includes one or more elements of the DOM. An element of the DOM may be included a plurality of collections. The collection may be a live collection that may be dynamically modified after creation.

At 704, an interface for the collection using a safety buffer is provided. In some embodiments, providing the interface includes extending one or more standard APIs traditionally associated with the collection with an extended API that allows the collection to be virtualized and/or managed (e.g., using client 406 and/or edge server 408 of FIG. 4). For example, the extended API includes the safety buffer that allows detection of an undetected element of the collection.

In some embodiments, one or more standard methods that add, remove, modify, and/or obtain elements to the collection are replaced with one or more extended versions. The extended versions conform to the syntax, protocol, and parameterization of the corresponding standard method but include extra functionality that allows the collection to be virtualized and/or managed (e.g., virtualized/managed using client 406 and/or edge server 408 of FIG. 4). For example, methods that modify or add elements to a collection are extended to detect and generate an indication when a change is made to the collection. When such methods are executed, the new/modified element(s) may be processed to allow virtualization/management of the new/modified element. In another example, methods that obtain an element of a collection are extended to detect and generate an indication when an attempt is made to access an element of the collection that has not been already processed for virtualization/management. Such element(s) may be processed to allow virtualization/management of the element.

In some embodiments, one or more standard methods that query the status of the collection and/or elements of the collection are extended with one or more extended versions. The extended versions conform to the syntax, protocol, and parameterization of the corresponding standard method but include extra functionality that allows the collection to be virtualized and/or managed (e.g., using client 406 and/or edge server 408 of FIG. 4). For example, methods that query the status of the collection or its elements (e.g., methods that query type of element included in the collection, size of the collection, etc.) are extended to detect and generate an indication when a status of the collection is verified. Utilization of such methods may indicate that the collection may have been modified. When such methods are executed, the collection may be analyzed to determine whether any of its elements have not been processed for virtualization/management (e.g., virtualized/managed using client 406 and/or edge server 408 of FIG. 4). Such element(s) may be processed to allow virtualization/management of the element.

In some embodiments, one or more dummy triggering elements may be added to a virtualized version of the collection (e.g., added to virtualized version of the collection as accessible by the webpage application) that triggers when a new element is being attempted to be accessed. For example, when an application or code is attempting to access a dummy element placed in the collection at a location known to be initially empty, it is a good indication that an additional element has been added to the underlying collection included in the DOM. Adding the dummy triggering element may include adding to a virtualized version of the collection one or more pointers referencing a triggering function, one or more triggering functions, and/or any other elements that indicate an access attempt of the triggering element. The number of elements added may be predetermined and/or dynamically determined based at least in part on a type of the collection, data included in other elements of the collection, and/or size of the collection. In some embodiments, the number of dummy elements to be added may be a fixed number for all elements. In some embodiments, the number of dummy elements added is determined at least in part empirically observing size of one or more collections during a sample execution of a specific application, one or more similar applications, and/or a general collection of applications. For example, an observed maximum collection is utilized as the number of dummy triggering elements to be added. In some embodiments, the adding the one or more dummy triggering elements includes modifying a class of the collection and objects of the class inherit the dummy elements. In some embodiments, when a dummy triggering element is triggered (e.g., linked triggering function is executed), the collection may be analyzed to determine whether any of its elements have not been processed for virtualization/management (e.g., virtualized/managed using client 406 and/or edge server 408 of FIG. 4). Such element(s) may be processed to allow virtualization/management of the element.

Figure 8:
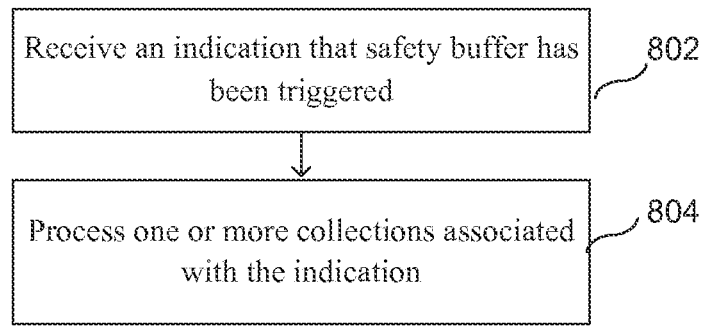
FIG. 8 is a diagram illustrating an embodiment of a flow diagram for processing a safety buffer trigger.

FIG. 8 is a diagram illustrating an embodiment of a flow diagram 800 for processing a safety buffer trigger. The steps shown in flow diagram 800 may be performed using web browser 402, client 406, and/or edge server 408.

At 802, an indication that safety buffer has been triggered is received. In some embodiments, receiving the indication includes detecting that a method/function is being executed. For example, one or more extended functions of the safety buffer described at 704 of FIG. 7 are detected as being invoked. For example, a function/method for adding, modifying, removing, and/or obtaining an element of a collection is detected as being invoked/executed. In another example, a function/method for determining a status/property of a collection is detected as being invoked/executed. In another example, a function associated with and/or referenced by a dummy triggering element is detected as being invoked/executed. In some embodiments, the indication is associated with a collection type hierarchy. For example, a modification associated with one collection type may trigger a modification of another associated collection type.

At 804, one or more collections associated with the indication are processed. In some embodiments, it is detected whether a specific element (e.g., specific element indicated by the received indication) of the collection has not been previously processed to allow virtualization/management of the element. In some embodiments, it is detected whether any of the element(s) of the collection have not been previously processed to allow virtualization/management of the element. Any collection element(s) that are determined to have been not previously processed are processed (e.g., associated method modified/replaced, element wrapped with data containers, functions, and/or other data of the virtualization, etc.) to allow virtualization/management of the element. In some embodiments, a safety buffer triggered for one collection may indicate that another associated collection may have been modified and the associated collection is processed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing interaction to an application with a collection of information stored in a Document Object Model, comprising:
a memory configured to:
store the Document Object Model; and
provide a processor with instructions;
the processor coupled with the memory, the processor configured to:
maintain the collection in the Document Object Model, wherein the collection is a type of node object in the Document Object Model;
construct a virtualization layer, wherein the virtualization layer is configured to:
provide one or more collection interfaces to the collection,
wherein the one or more collection interfaces includes a safety buffer;
intercept at least a portion of a network request;
replace the at least a portion of the network request with an extended version of the at least a portion of the network request, wherein the extended version includes extra functionality that allows the collection to be at least one of virtualized and managed;
in response to intercepting a request to create a dependent resource node in the Document Object Mode, generating, by the virtualization layer, a dummy node, wherein the dummy node includes a first segment of the dependent resource; and
enable, by the virtualization layer, interaction by the application with the collection, wherein at least one interaction of the application with the safety buffer triggers a functionality of the virtualization layer.

2. The system of claim 1, wherein the collection is a live collection.

3. The system of claim 1, wherein the collection includes one or more of the following: a table, a list, a linked list, a tree, a database, an array, and a hash table.

4. The system of claim 1, wherein the application is a managed programming language application of a webpage.

5. The system of claim 1, wherein a web browser corresponding to the Document Object Model is unaware of the virtualization layer.

6. The system of claim 1, wherein the virtualization layer manages requesting and receiving at least a portion of an element of the Document Object Model.

7. The system of claim 1, wherein the virtualization layer intercepts at least a portion of an element of the collection provided by the processor to the application.

8. The system of claim 1, wherein the virtualization layer was injected in a web content processed by the processor.

9. The system of claim 1, wherein the safety buffer includes an extension of a method for obtaining an element of the collection.

10. The system of claim 1, wherein the safety buffer includes an extension of a method for adding an element to the collection.

11. The system of claim 1, wherein the safety buffer includes an extension of a method of for querying a status of the collection.

12. The system of claim 1, wherein:
the safety buffer includes one or more dummy triggering elements added to a virtualized version of the collection; and
the processor is further configured to determine a change to the collection based on a detected attempt to access at least one of the one or more dummy trigger elements.

13. The system of claim 12, wherein the one or more dummy triggering elements includes one or more pointers referencing one or more triggering functions.

14. The system of claim 1, wherein the interaction of the application with the safety buffer triggering the functionality includes accessing a method of the safety buffer.

15. The system of claim 1, wherein the interaction of the application with the safety buffer triggering the functionality includes accessing a safety buffer element of the collection.

16. The system of claim 1, wherein to trigger the functionality of the virtualization layer includes analyzing the collection to identify any element of the collection that has not been previously processed by the virtualization layer.

17. The system of claim 1, wherein to trigger the functionality of the virtualization layer includes processing an indicated element of the collection to allow the virtualization layer to manage at least a portion of the indicated element.

18. The system of claim 1, wherein the processor is further configured to generate placeholder content in response to a request for content, and the placeholder content includes a first portion renderable by the application and a second portion not renderable by the application.

19. The system of claim 1, wherein segmented content is delivered according to at least one of pre-determined segment sizes and frequency, the segment sizes and frequency selected based on network load.

20. The system of claim 1, wherein the first segment includes a first scan of a progressive image.

21. The system of claim 1, wherein the processor is further configured to:
　　determine that there is no event indicating that refreshing of a dependent resource node should be at least one of delayed and disabled; and
　　responsive to the determination there is no event indicating that the refreshing of a dependent resource node should be at least one of delayed and disabled, sending a request to obtain at least one remaining portion of the dependent resource node.

22. A method for providing interaction to an application with a collection of information stored in a Document Object Model, comprising:
　　maintaining the collection in the Document Object Model, wherein the collection is a type of node object in the Document Object Model is stored in a memory;
　　constructing a virtualization layer, wherein the virtualization layer is configured to:
　　　　intercept at least a portion of a network request;
　　　　replace the at least a portion of the network request with an extended version of the at least a portion of the network request, wherein the extended version includes extra functionality that allows the collection to be at least one of virtualized and managed;
　　providing, via the virtualization layer, one or more collection interfaces to the collection, wherein the one or more collection interfaces includes a safety buffer; and
　　in response to intercepting a request to create a dependent resource node in the Document Object Mode, generating, by the virtualization layer, a dummy node, wherein the dummy node includes a first segment of the dependent resource;
　　enabling, by the virtualization layer, interaction by the application with the collection, wherein at least one interaction of the application with the safety buffer triggers a functionality of the virtualization layer.

23. A computer program product for providing interaction to an application with a collection of information stored in a Document Object Model, the computer program product being embodied in a non-transitory computer readable storage medium and comprising computer instructions for:
　　maintaining the collection in the Document Object Model, wherein the collection is a type of node object in the Document Object Model is stored in a memory;
　　constructing a virtualization layer, wherein the virtualization layer is configured to:
　　　　intercept at least a portion of a network request;
　　　　replace the at least a portion of the network request with an extended version of the at least a portion of the network request, wherein the extended version includes extra functionality that allows the collection to be at least one of virtualized and managed;
　　providing, via the virtualization layer, one or more collection interfaces to the collection, wherein the one or more collection interfaces includes a safety buffer; and
　　in response to intercepting a request to create a dependent resource node in the Document Object Mode, generating, by the virtualization layer, a dummy node, wherein the dummy node includes a first segment of the dependent resource;
　　enabling, by the virtualization layer, interaction by the application with the collection, wherein at least one interaction of the application with the safety buffer triggers a functionality of the virtualization layer.

* * * * *